United States Patent
Tokunaka et al.

(10) Patent No.: US 8,655,139 B2
(45) Date of Patent: Feb. 18, 2014

(54) VIDEO RECORDING AND REPRODUCING SYSTEM AND READING METHOD OF VIDEO DATA

(75) Inventors: Junzo Tokunaka, Kanagawa (JP); Motohiro Terao, Kanagawa (JP); Rikuo Kittaka, Tokyo (JP)

(73) Assignee: Sony Corporation (JP)

( * ) Notice: Subject to any disclaimer, the term of this patent is extended or adjusted under 35 U.S.C. 154(b) by 972 days.

(21) Appl. No.: 12/231,526

(22) Filed: Sep. 3, 2008

(65) Prior Publication Data

US 2009/0067818 A1 Mar. 12, 2009

(30) Foreign Application Priority Data

Sep. 6, 2007 (JP) ................................. P2007-231863

(51) Int. Cl.
*H04N 5/76* (2006.01)
*H04N 9/80* (2006.01)

(52) U.S. Cl.
USPC .............. 386/46; 386/235; 386/239; 386/241

(58) Field of Classification Search
USPC .................................... 386/46, 235, 239, 241
See application file for complete search history.

(56) References Cited

U.S. PATENT DOCUMENTS

| | | | | |
|---|---|---|---|---|
| 2002/0163532 | A1* | 11/2002 | Thomas et al. | 345/723 |
| 2003/0093790 | A1* | 5/2003 | Logan et al. | 725/38 |
| 2004/0233806 | A1 | 11/2004 | Kawahara | |
| 2005/0210145 | A1* | 9/2005 | Kim et al. | 709/231 |
| 2008/0181579 | A1* | 7/2008 | Shuto | 386/124 |

FOREIGN PATENT DOCUMENTS

| | | | | |
|---|---|---|---|---|
| JP | 2004-312245 A | 11/2004 | | |
| KR | 2002084967 | * 11/2002 | ............. | G11B 20/12 |

OTHER PUBLICATIONS

"Secure," Webster's Third New International Dictionary, 3 pages.*
"Securing," YourDictionary.com, 2 pages.*

* cited by examiner

*Primary Examiner* — Carl Colin
*Assistant Examiner* — John Elmore
(74) *Attorney, Agent, or Firm* — Lerner, David, Littenberg, Krumholz & Mentlik, LLP

(57) ABSTRACT

A data reading device includes a reading means for reading video data recorded in a video processing device which records and plays back video data and a control means for controlling the reading means so as to read video data from the video processing device by transmitting a reading request of index data to a video writing device which writes the video data to the video processing device when video data whose index data indicating an address of the video data is not recorded in the video processing device from the video processing device, and by designating the address indicated by the index data transmitted from the video writing device.

5 Claims, 12 Drawing Sheets

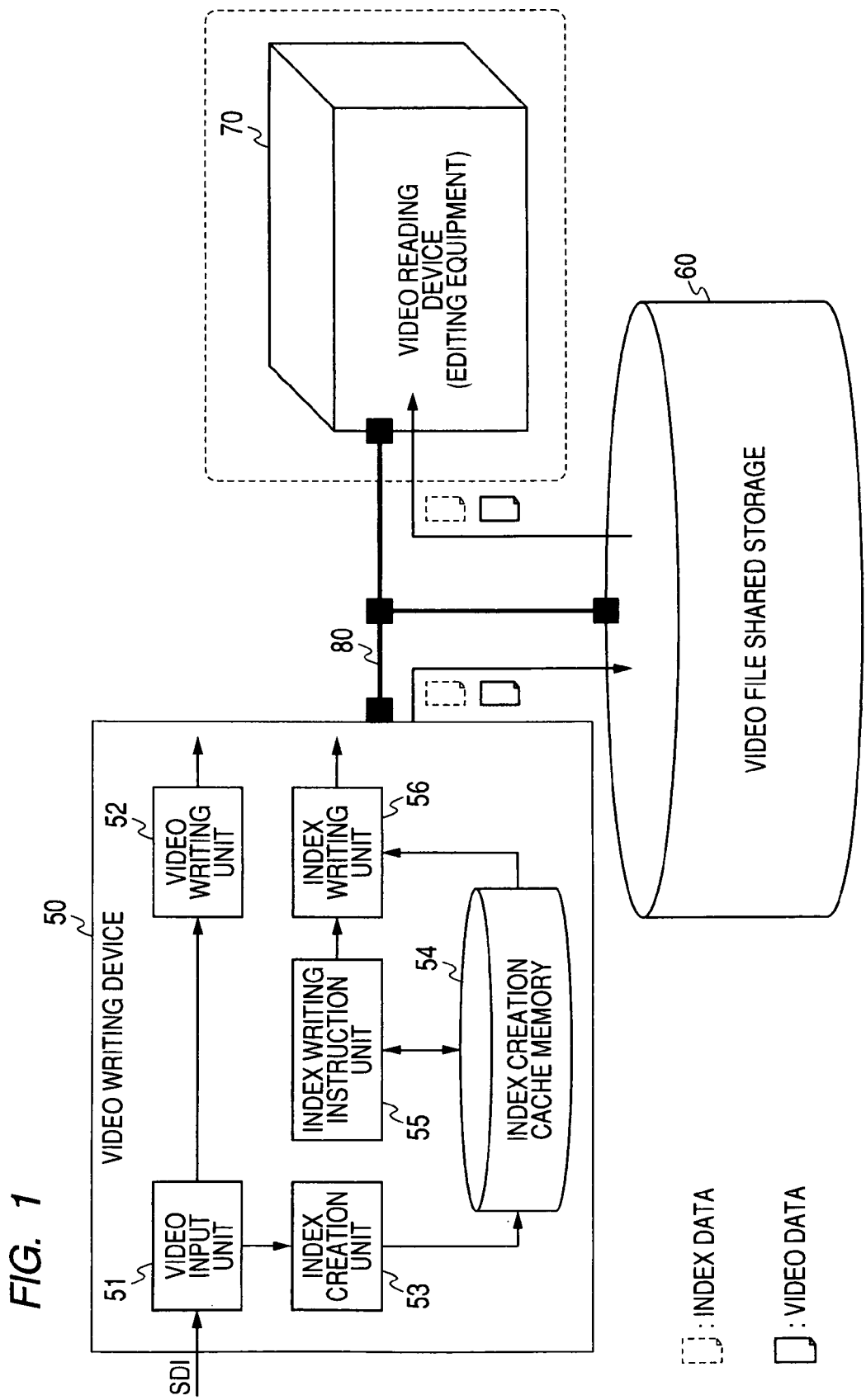

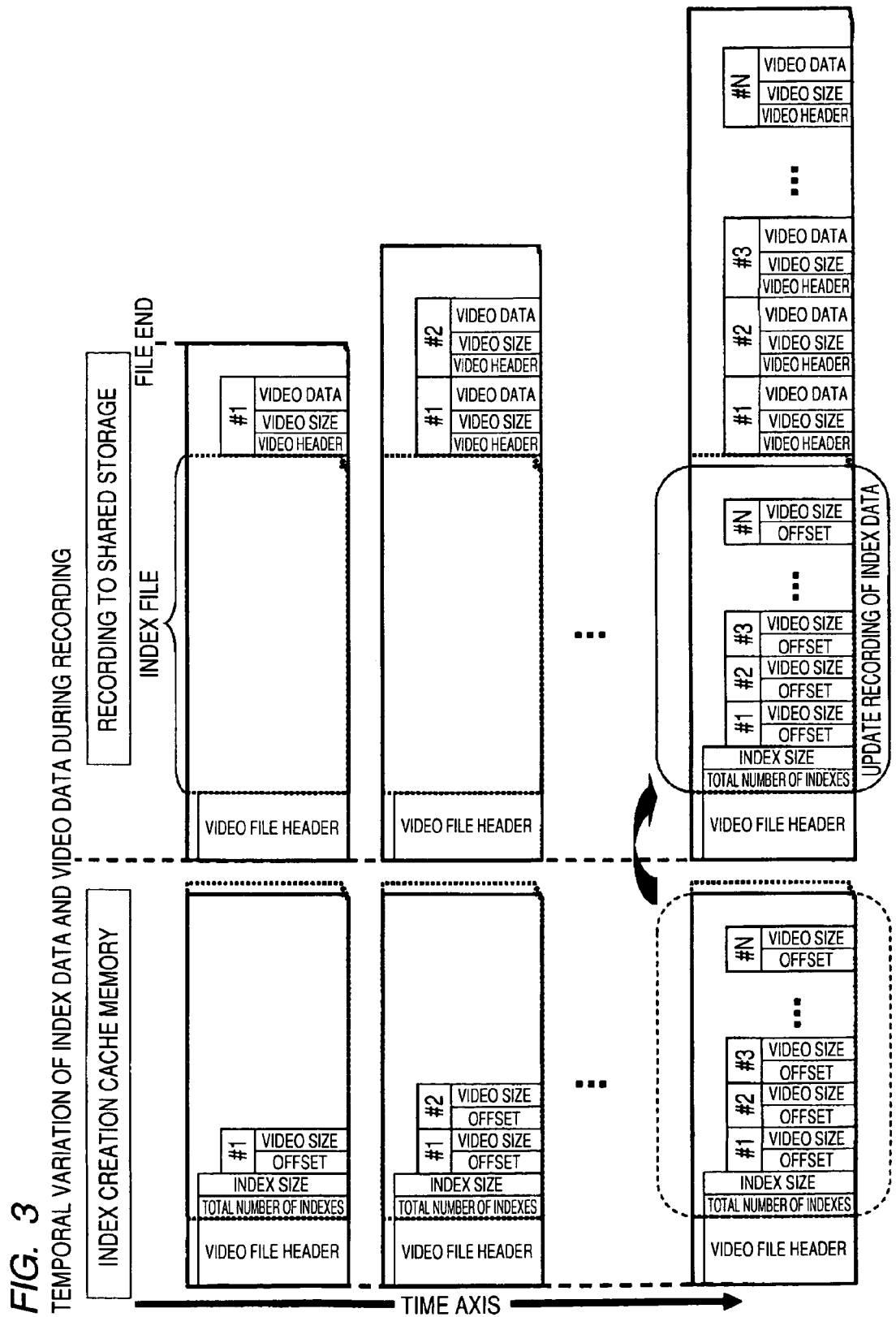

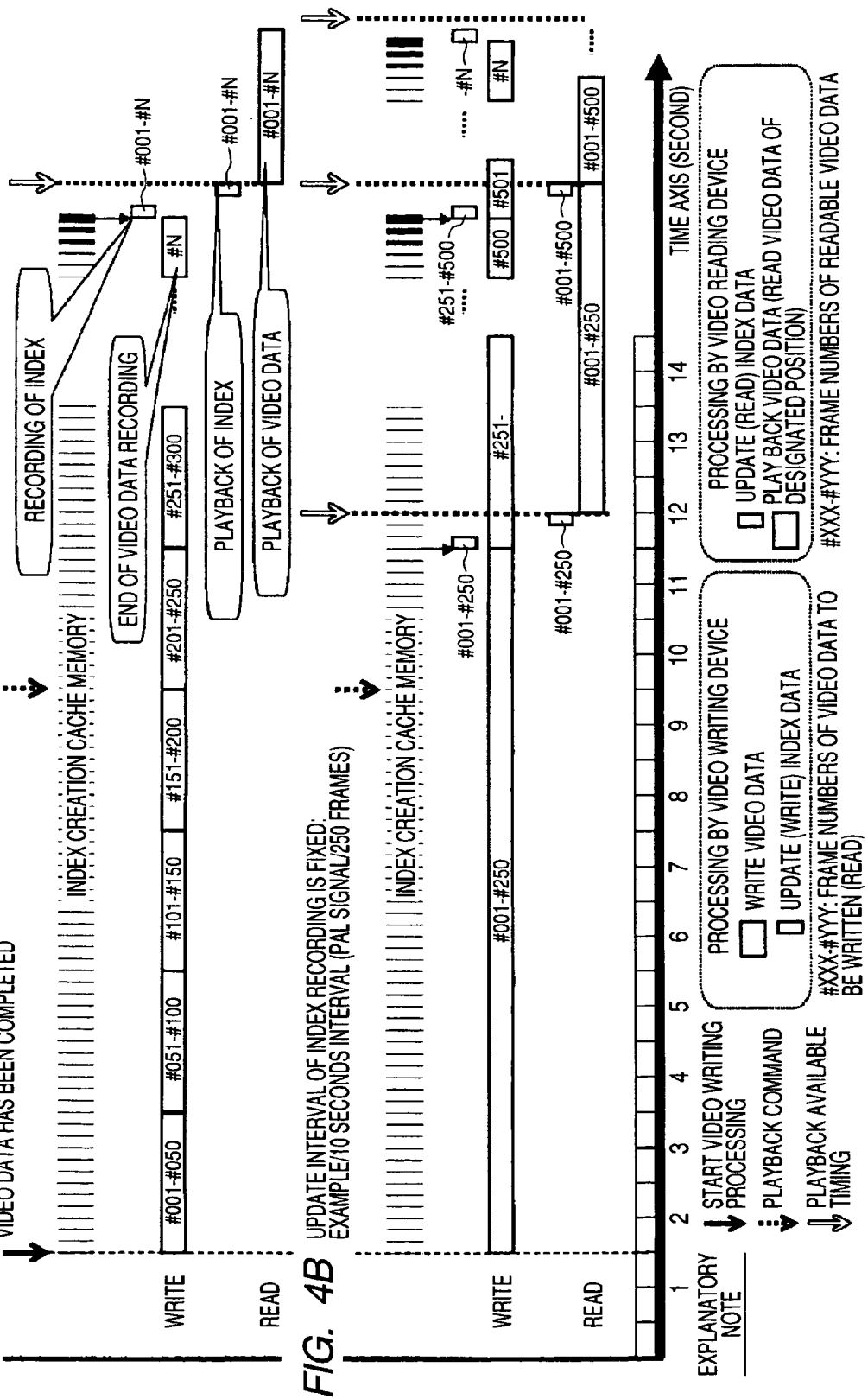

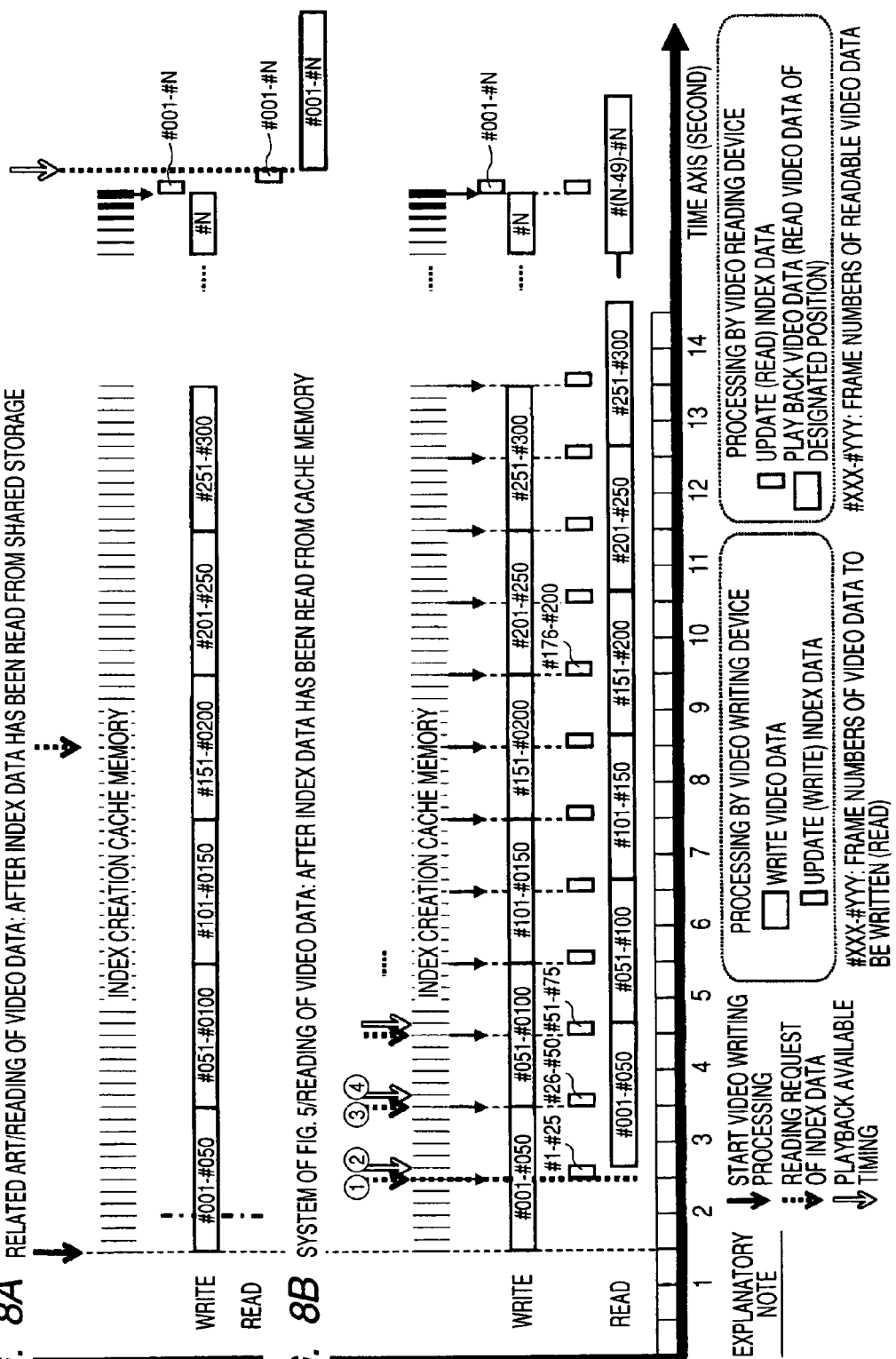

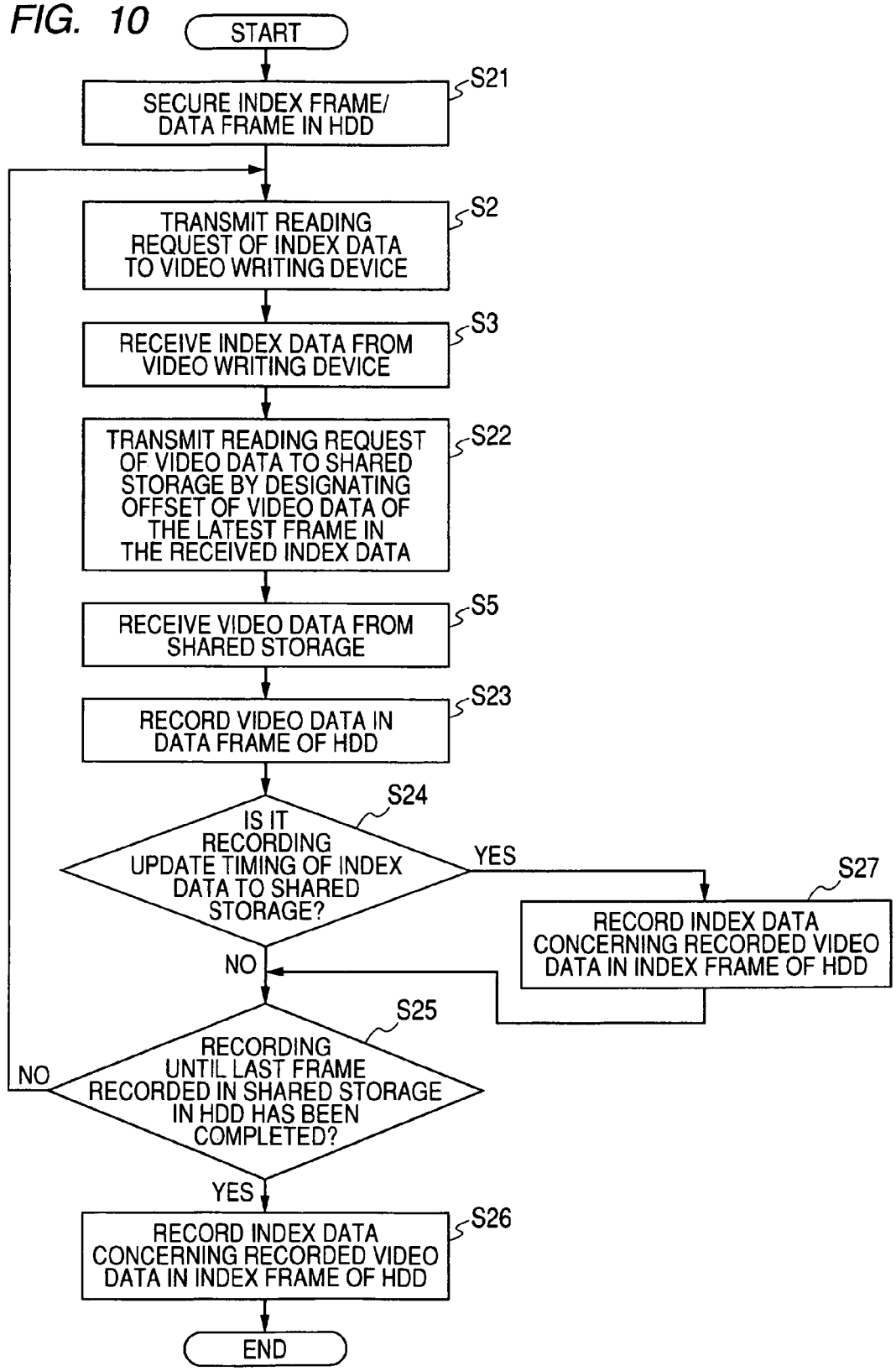

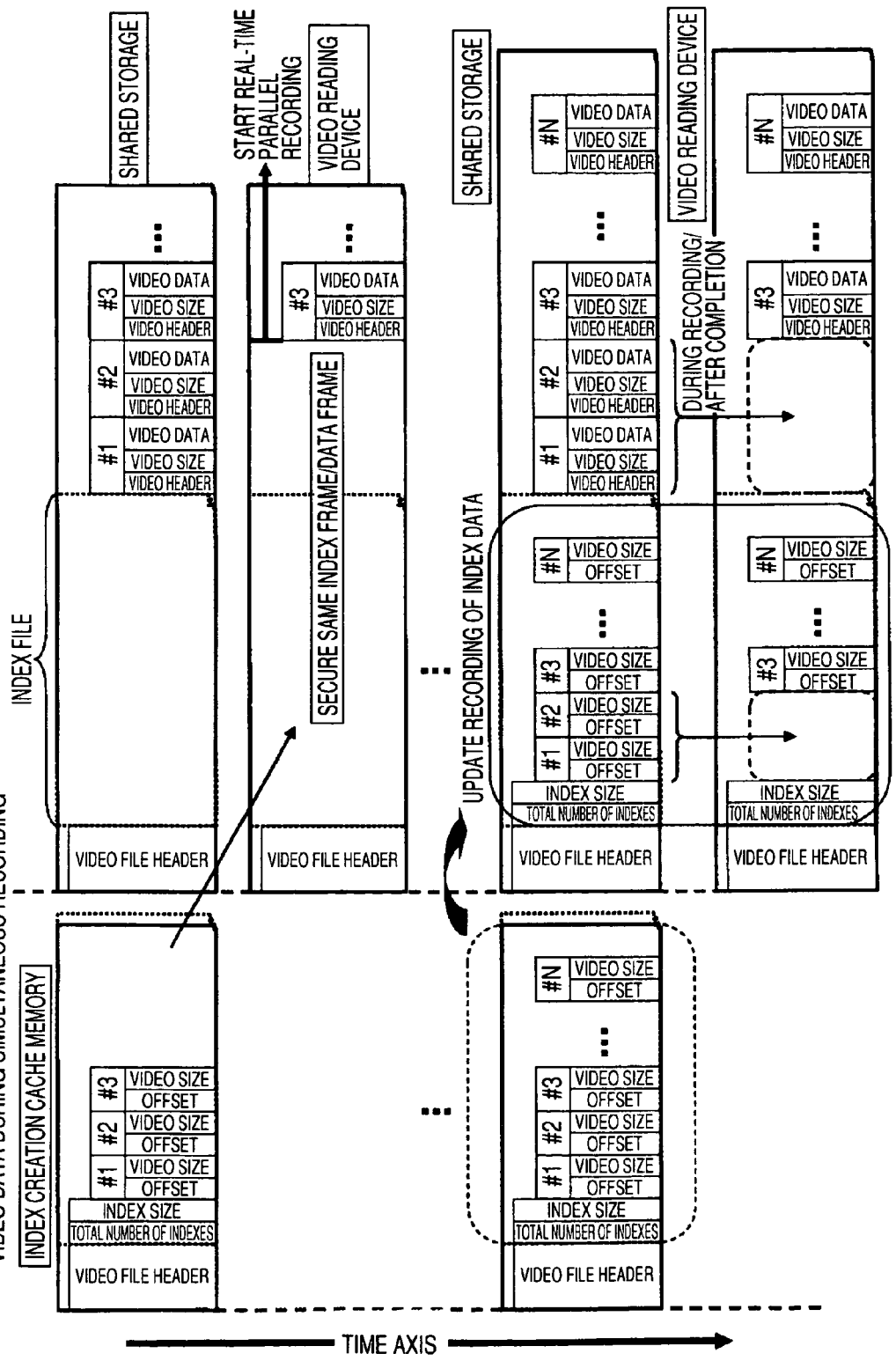

VIDEO RECORDING AND REPRODUCING SYSTEM AND READING METHOD OF VIDEO DATA

CROSS REFERENCE TO RELATED APPLICATIONS

The present application claims priority from Japanese Patent Application No. JP 2007-231863, filed in the Japanese Patent Office on Sep. 6, 2007, the entire content of which is incorporated herein by reference.

BACKGROUND OF THE INVENTION

1. Field of the Invention

The invention relates to a video recording and reproducing system to be applied to a news production system and the like in a television broadcast station.

2. Background Art

[Configuration and Data Flow of a News Production System of the Related Art]

In a television broadcast station, when producing a news program, video data (material) transmitted in real time from the news gathering field, satellite stations and the like is recorded in a storage having large capacity, reading and editing video data in the storage by editing equipment.

FIG. 1 is a block diagram showing a configuration and data flow of such news production system in the related art. The news production system includes a video writing device 50, a video file shared storage 60 (hereinafter, referred to merely as a shared storage 60) using a HDD (hard disc drive), a video reading device (editing equipment) 70 and a high-speed network 80 for transmitting and receiving video data. In the drawing, one video writing device 50 and one video reading device 70 are shown, however, there are some cases in which plural video writing devices 50 or plural video reading devices 70 are provided.

In the drawing, the data flow among the video writing device 50, the shared storage 60 and the video reading device 70 is shown by arrows connecting these devices for convenience, and all giving and receiving of data among these devices are performed through the network 80.

The video writing device 50 has an interface for inputting video data transmitted from the news gathering field or satellite stations. There are some cases in which video data is transmitted from news gathering field or satellite stations through the network or there are some cases in which video data is transmitted in accordance with a SDI (Serial Digital Interface) standard. In the example of FIG. 1, the case in which video data of the SDI standard is inputted is shown.

The video writing device 50 writes the inputted video data in the shared storage 60. At this time, the video writing device 50 writes index data with the video data in the video file shared storage 60 when the inputted video data includes index data. On the other hand, when the inputted video data does not include index data, the video writing device 50 creates index data from video data and writes the index data with the video data in the shared storage 60.

The video reading device 70 is a personal computer or a workstation on which a video reading software component for editing work is installed, reading index data recorded in the shared storage 60 to a local memory for rapidly having access to a frame at an arbitrary position in a video file.

When the frame at the arbitrary position is read by an operator, the video reading device 70 reads video data of that frame from the shared storage 60 (specifically, requesting the shared storage 60 to read the video data by designating an address of the video data of that frame indicated by the index data read in a local memory), and displays the read video data on a display (not shown).

The shared storage 60 is connected to the video writing device 50 and the video reading device 70 through the network 80. There is a case in which the video writing device 50, the video reading device 70 and the shared storage 60 form a SAN (Storage Area Network) and there is a case in which the shared storage 60 forms a NAS (Network Attached Storage).

The details of the video writing device 50 are as following (1) to (7).

(1) A video input unit 51 has an input interface for video data of the SDI standard, starting input of video data.

(2) The inputted video data is transmitted to a video writing unit 52, and the video writing unit 52 writes video data in the shared storage 60 in time series.

(3) The video input unit 51 gives information of the size of video data and information of an address (a later-described offset) in a file in which video data is stored to an index creation unit 53 at every video data of each frame at any time.

(4) The index creation unit 53 creates index data by using the above information, storing the index data on an index creation cache memory 54 (hereinafter, referred to merely as the cache memory 54).

(5) An index writing instruction unit 55 checks index data on the cache memory 54, requesting an index writing unit 56 to write the index data into the shared storage 60 when index data of an amount satisfying a writing interval currently updated is stored in the cache memory 54.

(6) The index writing unit 56, when receiving the writing request, writes the index data on the cache memory 54 in the shared storage 60.

(7) After that, the index writing instruction unit 55 updates the writing interval of index data.

[Configuration of a File Stream on the Shared Storage]

FIG. 2A and FIG. 2B are block diagrams showing a configuration of a file stream on the shared storage 60 of FIG. 1. There exist a case (index/video data separated type) in which an index table is created as a file independent of video data as shown in FIG. 2A, and a case (index/video data integrated type) in which the index table is included in a video file as shown in FIG. 2B.

In the index table, the total number of indexes (information of the total number of index data), the index size (size information of an index area) and information of offsets and video sizes of video data in all frames (frame No. #1 to #N) included in the video file.

The offset indicates an address of video data in each frame in the video file relatively, taking an address of video data at #1 frame as a 0-address. The video input unit 51 (FIG. 1) in the video writing device 50 calculates an offset value of the video data in the current frame by adding the size of video data in the current frame to an offset value of video data in a frame just before.

The video file includes video data, information of the video size and a video header at each frame in the video file. The video file also includes a video file header.

A time code indicating the current video position and the taken time is written in the video header, and there exist a manner in which the time code is written in only the video header of the first #1 frame (time codes after #2 frame are calculated by counting from the time code of frame #1) and a manner in which the time codes are written in video headers in all frames.

[Temporal Variation of Index and Video Data During Recording]

FIG. 3 is a block diagram showing temporal variation of index data and video data during recording in the shared storage 60 in FIG. 1, taking a file stream of FIG. 2B as an example.

The video data is written in the video file on the shared storage 60 independently of recording of index data at any time. Meanwhile, index data is stored in the cache memory 54 of FIG. 1.

At the time of recording update of index data, index data is read from the cache memory 54, the recording of index data to the shared storage 60 is updated (recording at the first recording update and additional updating of the recording contents until the previous time at the time recording updates after the second time as well as the recording contents in the video file header is updated.

At the time of recording update of index data to the shared storage 60 is performed, the video reading device 70 of FIG. 1 reads the index data from the shared storage 60, performing reading request to the shared storage 60 by designating an offset with respect to video data of an arbitrary frame in the index data to thereby read the video data from the shared storage 60.

For example, when the initial recording update of index data is performed at the time when video data for ten seconds from the head has been written in the video file, the video reading device 70 is able to have read-access to video data for ten seconds from the head at this point.

After that, when the second recording update of index data is performed at the time when video data for next ten seconds has been written in the video file, the video reading device 70 is able to have read-access to video data for twenty seconds from the head at this point.

Even in the case that video data has been actually written in the video file, if the recording update of index data corresponding to the video data has not been performed, the video reading device 70 will not be able to have read-access to the video data.

[Timing Chart from Writing to Reading]

FIG. 4A and FIG. 4B are charts showing processing timing of video data and index data with respect to the shared storage 60. There exist a case in which recording update of index data to the shared storage 60 is performed at the time when writing of video data of all frames to the shared storage 60 has been completed as shown in FIG. 4A and a case in which recording update of index data to the shared storage 60 is performed at regular intervals as shown in FIG. 4B.

As a demand in the market for the news production system, a demand for using video data transmitted in real time from the news gathering field, satellite stations and the like for editing immediately and a demand for checking whether correct video data is transmitted from the news gathering field, satellite stations and the like (whether different video data is transmitted incorrectly) immediately are increased. Accordingly, even during writing of video data to the shared storage 60, it is necessary to allow the video reading device 70 to read video data of a point at which writing has been completed from the shared storage 60 immediately.

In the case of FIG. 4A, for example, when video data of twenty minutes is recorded, recording update of index data is performed only once at the time of twenty minutes after, when writing of video data to the shared storage 60 has been completed. In the manner, playback available timing is delayed depending on the video data length (length of material). (Usually, the length of one video file is more than ten several seconds, therefore, it is necessary to wait at least more than ten several seconds in most cases).

In FIG. 4A, the recording of video data from #001 frame to #N frame is shown. After the recording of video data to the #N-th frame has been completed in the shared storage 60 as a video file, subsequently, index data concerning video data from #001 frame to #N frame read from the cache memory 54 in the video writing device 50 is recorded in the shared storage 60 as an index file.

The video data from #001 frame to #N frame can be read from the shared storage 60 by reading index data concerning the video data from #001 frame to #N frame from the shared storage 60 (actually, since only video data of a frame to be a target of reading operation in the video reading device 70 is read, video data of all frames is not always read from the head). Therefore, the playback available timing is after the recording of video data to #N frame has been completed, and even when a playback command (reading request) is received at the timing before that, it is difficult to play back video data.

In the case of FIG. 4B, a mechanism in which recording of index data is updated at regular intervals is applied in order to improve the disadvantage in the case of FIG. 4A. However, if the update interval is too short, the burden of the CPU in the shared storage 60 becomes heavy, therefore, the update interval is allowed to be the length of approximately ten several seconds, accordingly, it is necessary to wait for about ten several seconds (about fifteen seconds when the delay of other systems is included) until the playback will be possible.

In FIG. 4B, an example in which the recording update of index data is performed at every 250 frame (=every ten second) concerning video data of a PAL (625/50) system is shown. The first recording update (recording of index data concerning video data from #001 frame to #250 frame) is performed after video data from #001 frame to #250 frame is recorded, therefore, video data from #001 frame to #250 frame can be played back after the index data is played back. The operation is sequentially repeated, thereby realizing continuous playback (normal playback=one time speed).

The update interval of index data is set depending on a compression system of video data to be recorded. For example, in the case of the compression within the frame (intra frame) of MPEG 2, the update interval is set to an integer multiple of the frame (for example, 250 frames in the case of the PAL (625/50) system video data as shown in FIG. 4B). In the case of the compression between frames (inter frame) of MPEG 2, the update interval is set to integer multiple of GOP (for example, an integer multiple of 15 frames when 1 GOP includes 15 frames).

According to the above, in the news production system in the related art, it is difficult to read video data recorded in the shared storage 60 immediately even when recording update of index data to the shared storage 60 is performed at either timing of FIG. 4A and FIG. 4B, and it is necessary to wait for approximately ten several seconds. The length of such waiting time can hardly satisfy a demand for using video data for editing immediately or a demand for checking whether correct video data is transmitted or not as described above.

As a method of shortening the waiting time, there exists a method from the past, in which a proxy file in which a bit rate of video data transmitted from the news gathering field, satellite stations and the like is reduced to approximately 1/10 is created, the file is copied once in the video reading device 70, indexes are added in the video reading device 70, then, a preview or editing is performed by video data having low resolution.

However, there was a problem that "time for copying the file once" and "time for adding indexes" are necessary even though the video data of low resolution. Additionally, an EDL (editing list) is created based on the low-resolution video data in the video reading device 70, whereas in the shared storage 60, high-resolution video data is recorded/played back, therefore, a mechanism for coordinating both operations becomes necessary, which complicates the system. There is also a problem that it is difficult to perform the preview or editing work with video data having high resolution which is the same as the video data transmitted from the news gathering field or satellite stations.

In the document, in the field of processing of video, a technique is also proposed (JP-A-2004-312245 (Patent Document 1)), in which encoded data having a high bit rate which is the same as the inputted video data and encoded data having a lower bit rate than the inputted video data are recorded in one recording medium almost at the same time by time division and the encoded data having the recorded low-bit rate is read at the same time of these recording to thereby realize verifying or time-shift playback. However, also in the technique, it is difficult to read encoded data having the high-bit rate which is the same as the inputted data at the same time of recording.

SUMMARY OF THE INVENTION

In a video recording and reproducing system including a video recording and reproducing device (corresponds to a shared storage 60 in FIG. 1) capable of simultaneously recording and playing back video data, a video writing device (corresponds to a video writing device 50 in FIG. 1) writing video data inputted to the system in the video recording and reproducing device and a video reading device (corresponds to a video reading device 70 in FIG. 1) reading video data recorded in the video recording and reproducing device as in the news production system shown in FIG. 1, it is desirable that the video reading device can immediately read video data having high resolution which is the same as data inputted to the system during recording to the video recording and reproducing device.

A data reading device according to an embodiment of the invention includes: a reading means for reading video data recorded in a video recording and reproducing device which records and plays back video data; and a control means for controlling the reading means so as to read video data from the video recording and reproducing device by transmitting a reading request of index data to a video writing device which writes the video data in the video recording and reproducing device when video data whose index data indicating an address of the video data is not recorded in the video recording and reproducing device from the video recording and reproducing device, and by designating the address indicated by the index data transmitted from the video writing device.

A video recording and reproducing system according to another embodiment of the invention includes a video recording and reproducing device, a video writing device and the data reading device (video reading device).

In the video recording and reproducing system, when video data whose index data is not recorded in the video recording and reproducing device yet is read from the video recording and reproducing device, the control means in the video reading device transmits a reading request of index data to the video writing device.

When the reading request is transmitted from the video reading device, the control means in the video writing device transmits index data on the cache memory to the video reading device.

Index data which is not recorded in the video recording and reproducing device yet in index data concerning video data recorded in the video recording and reproducing device is stored on the cache memory in the video writing device, therefore, index data transmitted from the video writing device includes an address concerning video data as a reading target. The control means in the video reading device reads video data from the video recording and reproducing device by designating an address of video data as the reading target included in the index data transmitted from the video writing device.

As described above, it is possible to read video data from the video recording and reproducing device without waiting for the index data to be recorded in the video recording and reproducing device by using index data on the cache memory. Accordingly, video data having high resolution which is the same as the data inputted in the system can be immediately read during recording in the video recording and reproducing device.

Another embodiment of the invention is directed to a method of reading data includes the steps of: reading video data recorded in a video recording and reproducing device which records and plays back video data; and controlling the reading step so as to read video data from the video recording and reproducing device by transmitting a reading request of index data to a video writing device which writes the video data to the video recording and reproducing device when video data whose index data indicating an address of the video data is not recorded in the video recording and reproducing device from the video recording and reproducing device and by designating the address indicated by the index data transmitted from the video writing device.

In the method of reading video data, when video data whose index data is not recorded in the video recording and reproducing device yet is read from the video recording and reproducing device, the control means in the video reading device transmits a reading request of index data to the video writing device.

The control means in the video writing device transmits index data on the cache memory to the video reading device when the reading request is transmitted from the video reading device.

Index data which is not recorded in the video recording and reproducing device yet in index data concerning video data recorded in the video recording and reproducing device is stored on the cache memory in the video writing device, therefore, index data transmitted from the video writing device includes an address concerning video data as a reading target. The control means in the video reading device reads video data from the video recording and reproducing device by designating an address of video data as the reading target included in the index data transmitted from the video writing device.

As described above, it is possible to read video data from the video recording and reproducing device without waiting for the index data to be recorded in the video recording and reproducing device by using index data on the cache memory. Accordingly, video data having high resolution which is the same as the data inputted in the system can be immediately read during recording in the video recording and reproducing device.

According to an embodiment of the invention, in the video recording and reproducing system including the video recording and reproducing device capable of simultaneously recording and playing back video data, the video writing device writing video data inputted in the system in the video recording and reproducing device and the video reading device reading video data recorded in the video recording and reproducing device, an advantage that the video reading device can immediately read video data having high resolution which is the same as the data inputted in the system during recording in the video recording and reproducing device can be obtained.

BRIEF DESCRIPTION OF THE DRAWINGS

FIG. 1 is a block diagram showing a configuration and data flow of a news production system in the related art;

FIG. 3 is a block diagram showing temporal variation of index data and video data during recording in the shared storage in FIG. 1;

FIG. 4A and FIG. 4B are charts showing processing timing of video data and index data with respect to the shared storage of FIG. 1;

FIG. 8A and FIG. 8B are charts showing playback timing of video data from a shared storage in the news production system of FIG. 5;

FIG. 10 is a flowchart showing simultaneous recording processing executed by a CPU in the video reading device of FIG. 5; and FIG. 11 is a block diagram showing an example of temporal variation of index data and video data during simultaneous recording by the processing of FIG. 10.

DESCRIPTION OF THE PREFERRED EMBODIMENTS

Hereinafter, embodiments of the invention will be explained. In this case, an example in which the invention is applied to a news production system of a television broadcast station is explained while citing FIG. 2A to FIG. 4 with respect to portions common to these drawings.
[Configuration and Data Flow of a News Production System]

Figure 5:
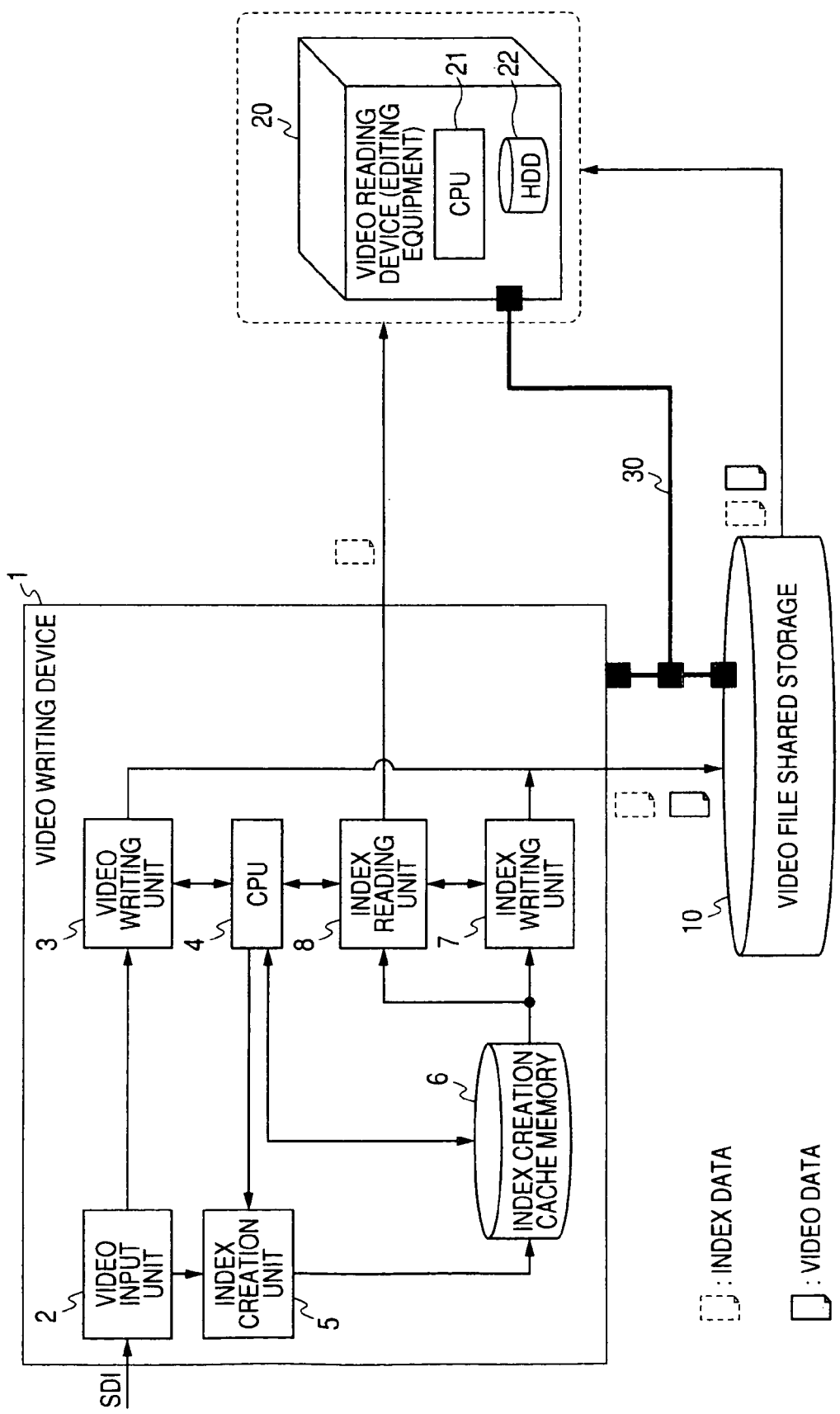
FIG. 5 is a block diagram showing a configuration and data flow of a news production system to which the invention is applied.

FIG. 5 is a block diagram showing a configuration and data flow of a news production system to which the invention is applied. The news production system includes a video writing device 1, a video file shared storage 10 (hereinafter, referred to merely as a shared storage 10) using a HDD, a video reading device (editing equipment) 20 and a high-speed network 30 for transmitting and receiving video data. In the drawing, one video writing device 1 and one video reading device 20 are shown, however, it is also preferable that plural video writing devices 1 and plural video reading devices 20 are provided.

In the drawing, the data flow among the video reading device 1, the shared storage 10, and the video reading device 20 are shown by arrows connecting these devices for convenience, however, all giving and receiving of data among these devices is performed through the network 30.

The video writing device 1 has an interface for inputting video data transmitted from the news gathering field or satellite stations and the like. There are some case in which video data is transmitted from the news gathering field or satellite stations and the like through the network or there are some cases in which video data is transmitted in accordance with the SDI standard and the like. In the example of FIG. 1, the case in which video data of SDI standard is inputted is shown.

The video writing device 1 writes the inputted video data in the shared storage 10. At this time, when the inputted video data includes index data, the video writing device 1 writes index data in the video file shared storage 10 with video data. On the other hand, when the inputted video data does not include index data, the video writing device 1 creates index data from video data, writing the index data in the shared storage 10 with video data.

The video reading device 20 is a computer on which a video reading software component for editing work is mounted.

The shared storage 10 is connected to the video writing device 1 and the video reading device 20 through the network 30. There is a case in which the video writing device 1, the video reading device 20 and the shared storage 10 form a SAN and there is a case in which the shared storage 10 forms NAS.

The details concerning recording processing of video writing device 1 are as following (1) to (5).

(1) A video input unit 2 has an input interface of SDI-standard video data, starting input of video data.

(2) The inputted video data is transmitted to a video writing unit 3. A CPU 4 controls the video writing unit 3 as well as transmits a recording command to the shared storage 10 to allow the shared storage 10 to write video data in time series.

Figure 2A:
FIG. 2A and FIG. 2B are block diagrams showing a configuration of a file stream on a shared storage of FIG. 1.
Figure 2B:
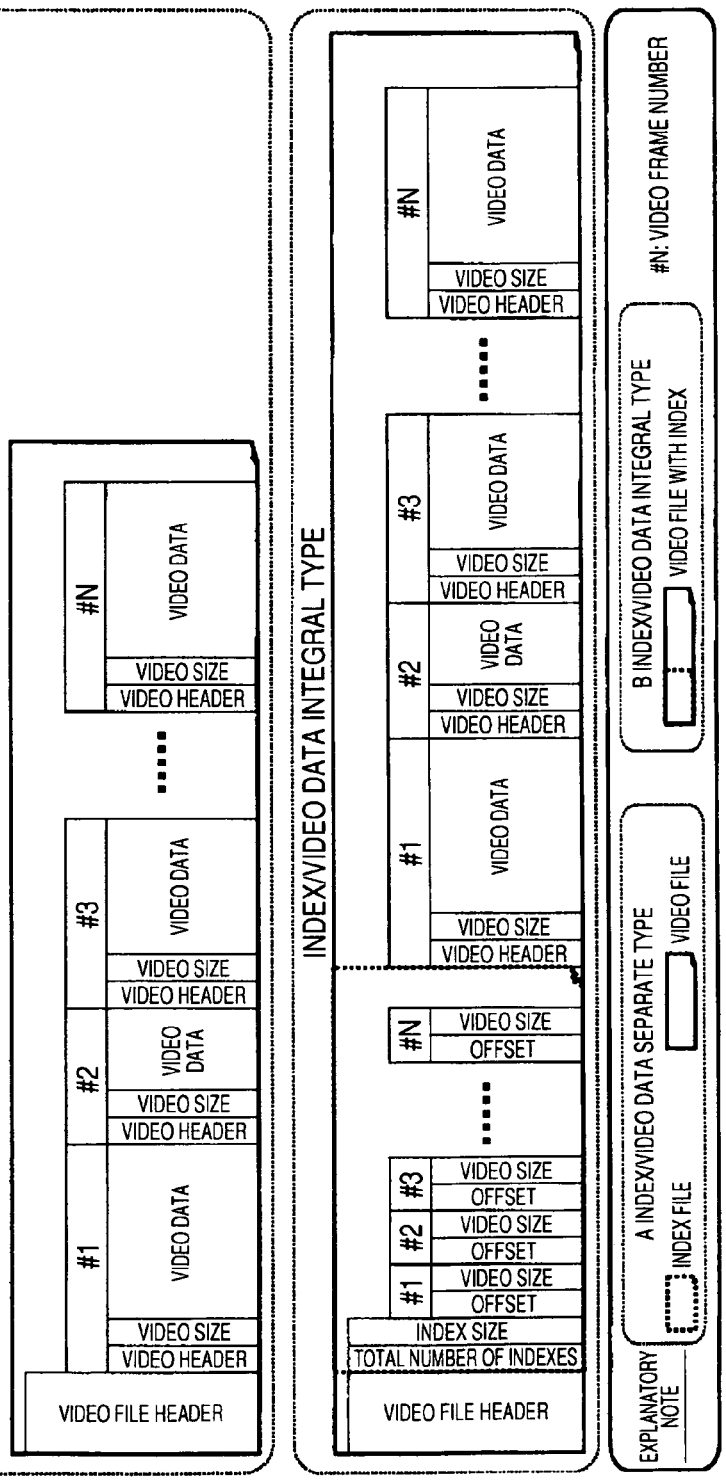

(3) The video input unit 2 gives information of the size of the video data and information of an address (offset as shown in FIG. 2B) in a file in which video data is stored to an index creation unit 5 at every video data of each frame at any time.

(4) The CPU 4 controls the index creation unit 5 to allow the unit to create index data (data as shown in FIG. 3) by using the above information and to store the index data on an index creation cache memory 6 (hereinafter, referred to merely as a cache memory 6).

(5) The CPU 4 checks index data on the cache memory 6 and controls the index writing unit 7 at the timing shown in FIG. 4A or FIG. 4B as well as transmits a recording command to the shared storage 10 to allow the shared storage 10 to write index data in a file stream structure as shown in FIG. 2A or FIG. 2B.

The video reading device 20 is a personal computer or a work station on which the video reading software component for editing work is installed, reading index data recorded in the shared storage 10 to a local memory for quickly accessing a frame at an arbitrary position of the video file.

Figure 6:
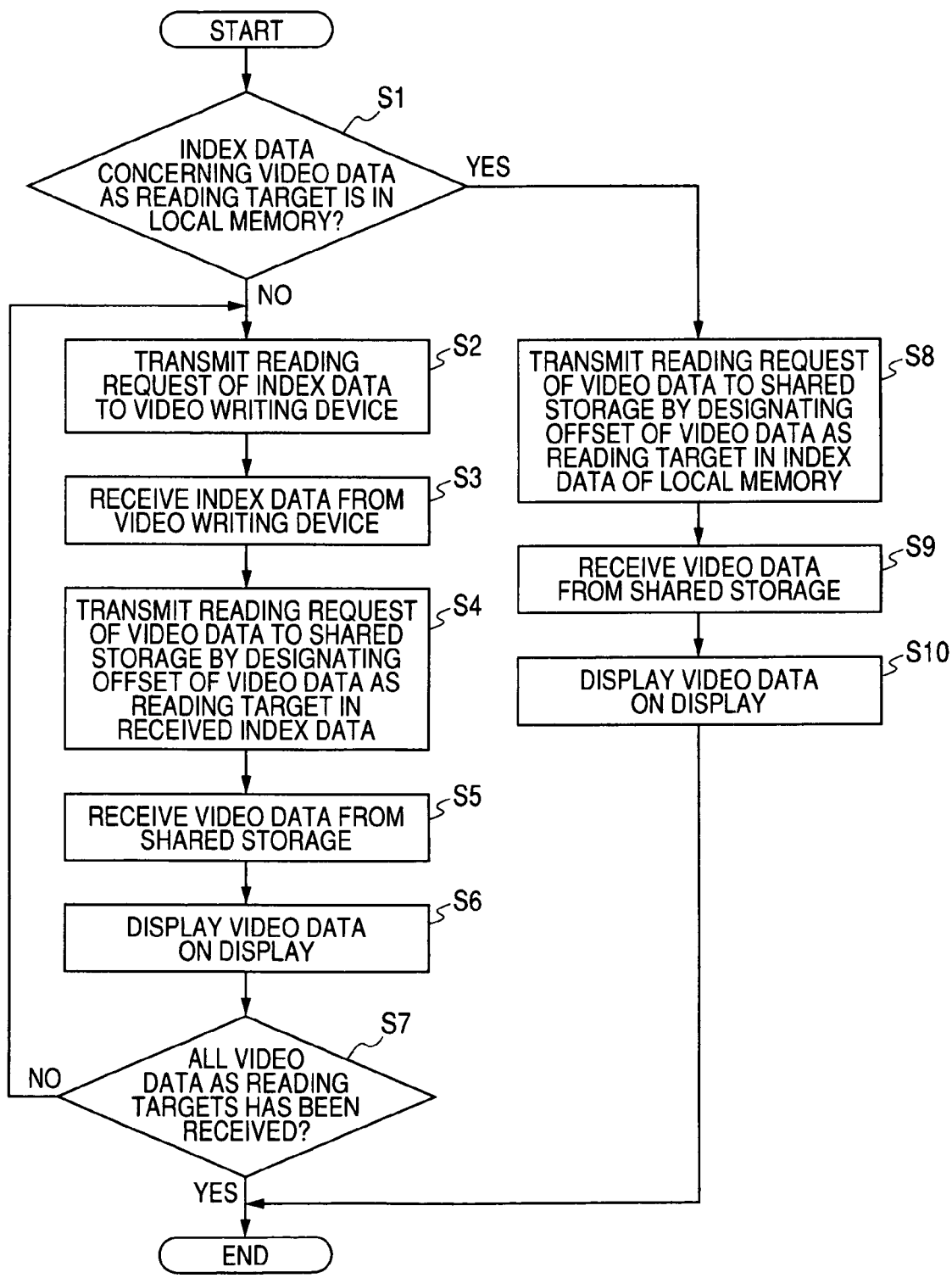
FIG. 6 is a flowchart showing video reading processing executed by a CPU in a video reading device of FIG. 5.

In the video reading device 20, operation of reading video data of an arbitrary frame of an arbitrary video file (all frames, continuous plural frames, discontinuous plural frames or a single frame) from the shared storage 10 is performed. FIG. 6 is a flowchart showing processing of reading video executed by a CPU 21 in the video reading device 20 based on the fact that the reading operation has been performed.

In the processing, first, whether index data concerning video data as a target of reading operation is included in index data read in the local memory at present (that is, stored in the shared storage 10 at present) or not is determined (Step S1).

If the result is negative (that is, index data concerning video data as the target of reading operation is not recorded in the shared storage 10 yet), the CPU 21 performs reading request of index data to the video writing device 1 (Step S2).

Figure 7:
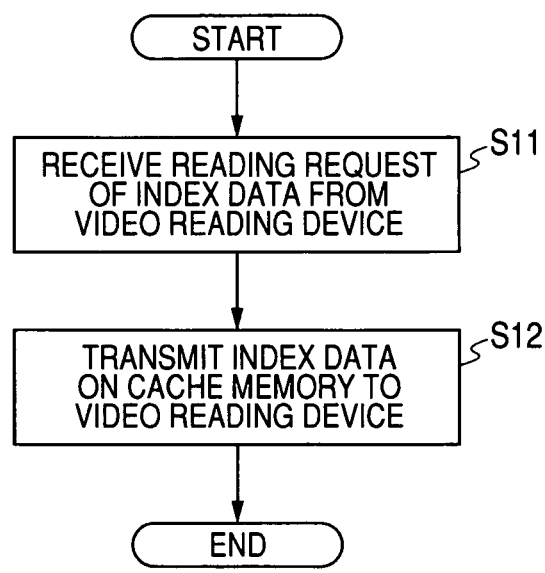
FIG. 7 is a flowchart showing processing executed by the CPU in the video reading device in FIG. 5 so as to correspond to the processing of FIG. 6.

FIG. 7 is a flowchart showing processing executed by the CPU 4 in the video writing device 1, corresponding to the processing of FIG. 6. In the processing, when a reading request of index data is received from the video reading device 20 (Step S11), the CPU 4 controls an index reading unit 8 to transmit index data stored in the cache memory 6 (FIG. 5) to the video reading device 20 (Step S12). Then, the process ends.

The index data which is not recorded in the shared storage 10 yet in index data concerning video data recorded in the shared storage 10 is stored in the cache memory 6 in the video writing device 1, therefore, index data transmitted from the video writing device 1 by the processing of FIG. 7 includes an address concerning video data as the reading target.

As shown in FIG. 6, when the CPU 21 in the video reading device 20 receives index data from the video writing device 1 (Step S3), the CPU 21 transmits a reading request of video data to the shared storage 10 by designating a file name of the video file including video data as the reading target and an offset (FIG. 2B) of video data as the reading target included in the index data transmitted from the video writing device 1 (Step S4). Then, when receiving video data from the shared storage 10 (Step S5), the video data is displayed on a display (not shown) of the video reading device 20 (Step S6).

Subsequently, whether all video data as the target of reading operation has been received from the shared storage 10 or not is determined (Step S7). If the result is negative, the process returns to Step S2, repeating Step S2 to S7. If the result is affirmative, the process ends.

As described above, video data can be read from the shared storage 10 without waiting for the index data to be recorded in the shared storage 10 by using index data on the cache memory 6. Accordingly, video data having high resolution which is the same as the data inputted into the system can be immediately (from the timing of a frame next to the recorded frame) read during recording in the shared storage 10.

When the result of Step 1 is affirmative (that is, when index data concerning video data as a target of reading operation has already been recorded in the shared storage 10 and has been read in the local memory), the CPU 21 transmits a reading request to the shared storage 10 by using the index data (Step S8). Then, when video data is received from the shared storage 10 (Step S9), the video data is displayed on the display (not shown) of the video reading device 20 and the process ends. The processing in this case is the same as the processing of the video reading device 70 of the news production system of the related art shown in FIG. 1.

[Timing Chart from Writing to Reading]

FIG. 8A and FIG. 8B are charts exemplifying playback timing of video data from the shared storage 10 in the news production system of FIG. 5 by comparing the timing with playback timing of video data from shared storage 60 in the news production system shown in FIG. 1. FIG. 8A shows the playback timing in the news production system in the related art (same chart as shown in FIG. 4A), and FIG. 8B shows the playback timing in the news production system of FIG. 5.

In FIG. 8B, video data from #001 frame to #025 frame is written in the shared storage 10 at the timing shown by a numeral 1 surrounded by a circle, and index data concerning video data from #001 frame to #025 frame is stored in the cache memory 6 in the video writing device 1.

At this timing, when a reading request of index data is transmitted from the video reading device 20 to the video writing device 1 (Step S2 of FIG. 6), index data concerning video data from #001 frame to #025 frame is transmitted from the video writing device 1 to the video reading device 20 (Step S11 and S12 of FIG. 7 and S3 of FIG. 6).

Accordingly, at the timing shown by a numeral 2 surrounded by a circle, video data from #001 frame to #025 frame can be read from the shared storage 10 (Step S4 and S5 of FIG. 6).

After that, at the timing shown by a numeral 3 surrounded by a circle, video data from #025 frame to #050 frame is written in the shared storage 10, and index data concerning video data from #025 frame to #050 frame is also stored in the cache memory 6 of the video writing device 1.

At this timing, when a reading request of index data is transmitted from the video reading device 20 to the video writing device 1 (Step S2 of FIG. 6), the index data concerning video data from #025 frame to #050 frame is also transmitted from the video writing device 1 to the video reading device 20 (Step S11 and S12 of FIG. 7 and S3 of FIG. 6).

Accordingly, at the timing shown by a numeral 4 surrounded by a circle, video data from #025 frame to #050 frame can be read from the shared storage 10 (Step S4 and S5 of FIG. 6).

After that, the same processing is repeated at every 25 frame in the same manner (that is, the processing of Step 2 to S7 of FIG. 6 is repeated at every 25-frame cycle), thereby video data from #001 frame to #N frame can be continuously read from the shared storage 10 at every 25 frame after the timing shown by the numeral 2 surrounded by a circle (actually, since only video data of a frame as a target of reading operation in the video reading device 20 is read, video data of all frames is not always read from the head).

Supposing that the processing such that video data of #001 frame is read from the shared storage 10 by transmitting a reading request of index data at the timing when video data of the top #001 frame is written in the shared storage 10, then, video data of #002 frame is read from the shared storage 10 by transmitting a reading request of index data at the timing when the video data of #002 frame is written in the shared storage 10 is repeated (that is, the processing from Step S2 to S7 of FIG. 6 is repeated at every one-frame cycle), video data from #001 frame to #N frame can be continuously read from the shared storage 10 at every one frame just after video data of the top #001 frame is written in the shared storage 10.

As described above, in the news production system of FIG. 5, there is no constraint of index data by the recording update timing to the shared storage 10 concerning reading of video data from the shared storage 10, therefore, it is possible to set the reading timing of video data from the shared storage 10 independently of the recording update timing of index data.

Figure 9A:
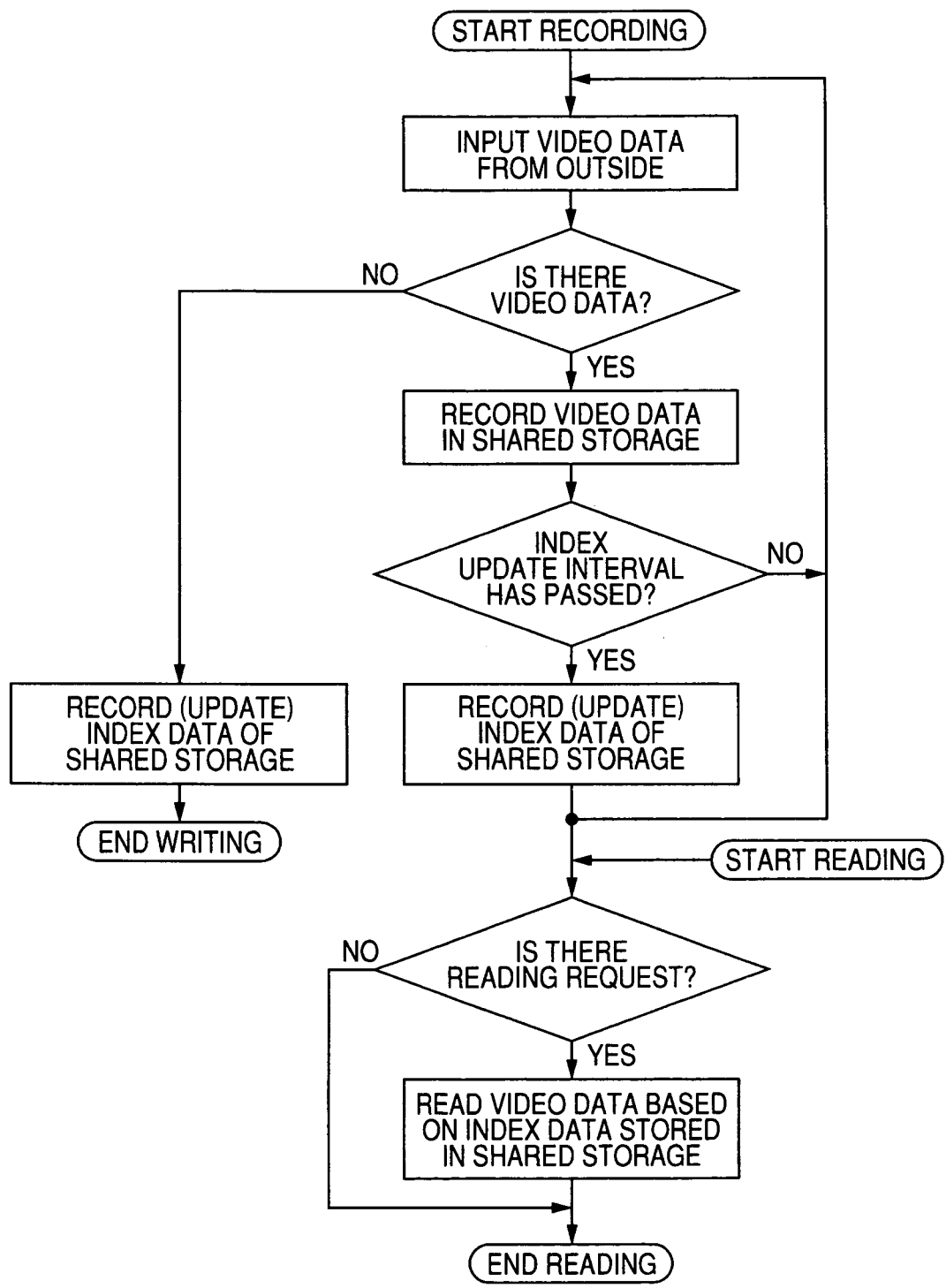
FIG. 9A and FIG. 9B show processing flows of recording/reading of video data in the whole news production system of FIG. 5.
Figure 9B:
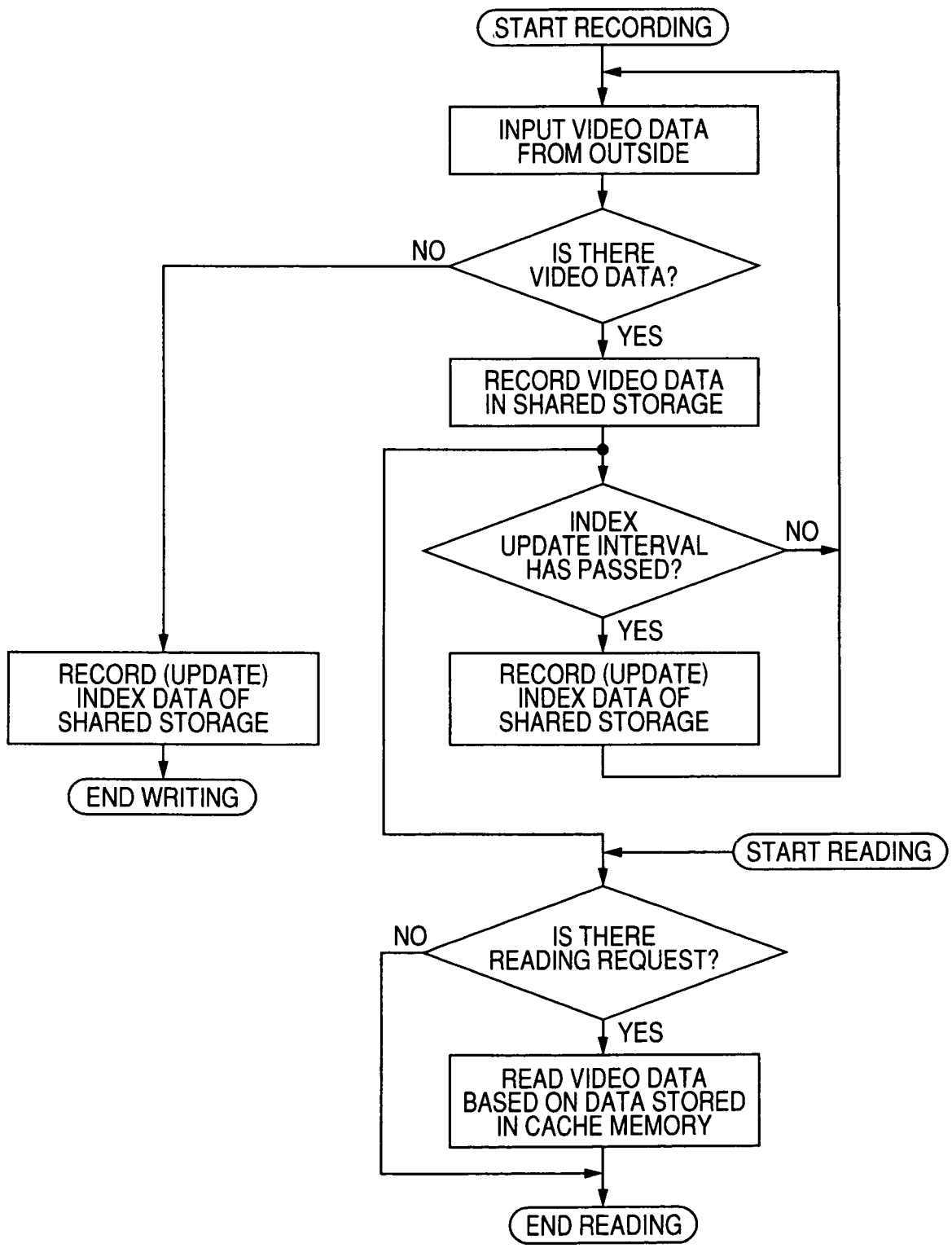

FIG. 9A and FIG. 9B are flowcharts showing portions different from the news production system of the related art shown in FIG. 1 in the processing flow of recording/reading of video data in the whole news production system of FIG. 5. FIG. 9A shows a processing flow in the news production system in the related art and FIG. 9B shows a processing flow in the news production system of FIG. 5.

The news production system of FIG. 5 is different from the news production system of the related art shown in FIG. 1, in which video data recorded in the shared storage 10 is read by using index data on the cache memory 6 in the video writing device 1 before the recording update timing of index data to the shared storage 10.

As described above, in the news production system of FIG. 5, index data on the cache memory 6 in the video writing device 1 is used, thereby reading video data from the shared storage 10 without waiting for the index data to be recorded in the shared storage 10.

Accordingly, the video reading device 20 can immediately read video data having high resolution which is the same as video data inputted into the system during recording to the shared storage 10 to perform preview or editing.

As described in the background art, when the preview or editing is performed by using video data having low resolution, the video reading device creates an EDL based on the video data having low resolution, whereas the shared storage records/plays back video data having high resolution, therefore, a mechanism for coordinating both operations becomes necessary, which complicates the system. On the other hand, the mechanism for coordination is not necessary by performing preview or editing by using video data having high resolution, which enables the system to have a simple configuration.

[Others]

Lastly, as another operation example of the news production system of FIG. 5, an example in which video data during recording in the shared storage 10 is recorded in a HDD 22 in the video reading device 20 at the same time (in real time and in parallel) will be explained.

FIG. 10 is a flowchart showing processing executed by the CPU 21 in the video reading device 20 for the simultaneous recording. The same step numbers are putted to steps having the same contents as the video reading processing shown in FIG. 6.

In the processing, first, an index frame which is an area in which index data is recorded and a data frame in which video data is recorded are secured in the HDD 22 (Step S21).

Subsequently, a reading request of index data is performed to the video writing device 1 (Step S2). The CPU 4 in the video writing device 1 performs processing shown in FIG. 7 also with respect to the reading request of index data in the processing of FIG. 10.

As shown in FIG. 10, following Step S2, when index data is received from the video writing device 1 (Step S3), the CPU 21 transmits a reading request of video data to the shared storage 10 by designating a file name of a video file in which video data as a reading target is included and an offset (FIG. 2B) of video data of the latest frame included in the index data transmitted from the video writing device 1 (Step S22).

Then, when video data is received from the shared storage 10 (Step S5), the video data is recorded in the data frame of HDD 22 secured in Step S21 (Step S23).

Subsequently, whether recording update timing of index data to the shared storage 10 has come or not is determined (Step S24).

If the result is negative, whether the recording until video data of the latest frame recorded in the shared storage 10 to the HDD at Step S23 has been completed or not is determined (Step S25).

If the result is negative, the process returns to Step S2, and the processing after Step S2 is repeated at one frame cycle.

If the result is affirmative in Step S25, index data concerning video data which has been recorded in the HDD 22 is recorded in the index frame of the HDD 22 secured in Step S21 (Step S26). Then, the process ends.

When the result is affirmative in Step 24 before affirmative in Step S25 (when recording update of index data is performed at regular intervals as shown in FIG. 4B), index data concerning video data which has been recorded in the HDD 22 is recorded in the index frame of the HDD 22 (Step S27), and the process proceeds to Step S25.

FIG. 11 is a block diagram showing an example in which simultaneous recording in the video reading device 20 is started from video data of #003 frame as an example of temporal variation of index data and video data during simultaneous recording by the processing of FIG. 10.

At the timing when the recording of video data until #N frame in the shared storage 10 has been completed, the recording update of index data in the shared storage 10 is performed, and index data concerning video data from #003 frame to #N frame is recorded in the index frame of the HDD 22 (video data from #001 frame to #002 frame is not recorded in the HDD 22, therefore, index data concerning the video data is not recorded in the index frame).

Concerning #001 frame to #002 frame, it is also preferable that index data and video data are sequentially read from the shared storage 10, for example, after the simultaneous recording has been completed or at the time of recording update of index data during the simultaneous recording to be recorded in the index frame and the data frame of the HDD 22 respectively, if necessary.

Accordingly, index data on the cache memory 6 in the video writing device 1 is used, thereby recording video data which is being recorded to the shared storage 10 in the video reading device 20 at the same time (with a one-frame delay).

In the above embodiment, the invention is applied to the news production system in which an offset which is information relatively indicating an address of video data in the video file is included in the index data as address information of video data. However, the invention is not limited to this, and it is also preferable that the invention is applied to the news production system in which information indicating a physical address in the shared storage is included in index data as address information of video data.

In the above embodiment, the invention is applied to the news production system. However, the invention is not limited to this, and can be applied to various video recording and reproducing systems including the video recording and reproducing device capable of simultaneously recording and playing back video data, the video writing device writing video data inputted to the system in the video recording and reproducing device and a video reading device reading video data recorded in the video recording and reproducing device.

It should be understood by those skilled in the art that various modifications, combinations, sub-combinations and alterations may occur depending on design requirements and other factors insofar as they are within the scope of the appended claims or the equivalents thereof.

What is claimed is:

1. A data reading device comprising: a processor operable:
for reading, over a communication network, video data recorded in a video processing device which records and plays back video data; and
for controlling the reading video data recorded in the video processing device so as to read video data from the video processing device over the communication network (i) by transmitting, over the communication network, a reading request of index data to a video writing device, which writes the video data to the video processing device over the communication network, when a result of a determination from video data read over the communication network from the video processing device is index data of the video data read indicating an address of the video data read is not recorded in the video processing device, and (ii) by transmitting a reading request of video data over the communication network to the video processing device designating the address indicated by the index data transmitted over the communication network from the video writing device responsive to the reading request of index data received at the video writing device, before the index data is written according to a recording update timing by the video writing device to the video processing device over the communication network, wherein the transmitting of the reading request of index data to the video writing device and the transmitting of the reading request of video data to the video processing device designating the address are controlled such that a frame of video data as a reading target can be immediately read from the video processing device by a video reading device over the communication network during recording of the frame and a next frame of the video data to the video processing device by the video writing device independent of a request by the video reading device.

2. The data reading device according to claim 1, wherein the processor is operable:

for securing an index frame which is an area in which the index data is recorded and a data frame which is an area in which the video data is recorded in a recording means of the data reading device in which the video data is recorded;

for transmitting a reading request of the index data to the video writing device over the communication network;

for reading over the communication network video data from the video processing device and recording the read video data in the data frame of the recording means by designating an address indicated by the index data transmitted from the video writing device; and for recording the index data concerning video data recorded in the data frame in an index frame of the recording means.

3. The data reading device according to claim 1, wherein the video writing device includes a memory storing index data indicating an address of the video data; and a second processor operable for writing, over the communication network, index data stored in the memory in the video processing device.

4. A method of reading data comprising the steps of:

reading, over a communication network, video data recorded in a video processing device which records and plays back video data; and controlling the reading step so as to read video data from the video processing device over a communication network (i) by transmitting, over the communication network, a reading request of index data to a video writing device, which writes the video data to the video processing device over the communication network, when a result of a determination from video data read over the communication network from the video processing device is index data of the video data read indicating an address of the video data read is not recorded in the video processing device, and (ii) by transmitting a reading request of video data over the communication network to the video processing device designating the address indicated by the index data transmitted over the communication network from the video writing device responsive to the reading request of index data received at the video writing device, before the index data is written according to a recording update timing by the video writing device to the video processing device over the communication network, wherein the transmitting of the reading request of index data to the video writing device and the transmitting of the reading request of video data to the video processing device designating the address are controlled such that a frame of video data as a reading target can be immediately read from the video processing device by a video reading device over the communication network during recording of the frame and a next frame of the video data to the video processing device by the video writing device independent of a request by the video reading device.

5. A data reading device comprising:

a processor including a reading unit configured to read, over a communication network and under control of the processor, video data recorded in a video processing device which records and plays back video data; and a control unit configured to control, under control of the processor, the reading unit so as to read video data from the video processing device over the communication network (i) by transmitting, over the communication network a reading request of index data to a video writing device, which writes the video data to the video processing device over the communication network, when a result of a determination from video data read over the communication network from the video processing device is index data of the video data read indicating an address of the video data read is not recorded in the video processing device, and (ii) by transmitting a reading request of video data over the communication network to the video processing device designating the address indicated by the index data transmitted over the communication network from the video writing device responsive to the reading request of index data received at the video writing device, before the index data is written according to a recording update timing by the video writing device to the video processing device over the communication network, wherein the transmitting of the reading request of index data to the video writing device and the transmitting of the reading request of video data to the video processing device designating the address are controlled such that a frame of video data as a reading target can be immediately read from the video processing device by a video reading device over the communication network during recording of the frame and a next frame of the video data to the video processing device by the video writing device independent of a request by the video reading device.

* * * * *